(12) United States Patent
Hui et al.

(10) Patent No.: US 10,566,133 B2
(45) Date of Patent: Feb. 18, 2020

(54) APPARATUS AND METHOD FOR WIRELESS POWER TRANSFER

(75) Inventors: Ron Shu Yuen Hui, Shatin (HK); Wenxing Zhong, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 535 days.

(21) Appl. No.: 13/979,532

(22) PCT Filed: Jan. 14, 2011

(86) PCT No.: PCT/IB2011/000050
§ 371 (c)(1),
(2), (4) Date: Oct. 10, 2013

(87) PCT Pub. No.: WO2012/095682
PCT Pub. Date: Jul. 19, 2012

(65) Prior Publication Data
US 2014/0028112 A1 Jan. 30, 2014

(51) Int. Cl.
*H02J 50/12* (2016.01)
*H02J 50/50* (2016.01)
*H02J 7/02* (2016.01)
*H01F 38/14* (2006.01)

(52) U.S. Cl.
CPC .............. *H01F 38/14* (2013.01); *H02J 7/025* (2013.01); *H02J 50/12* (2016.02); *H02J 50/50* (2016.02)

(58) Field of Classification Search
CPC .. B60L 5/005; B60L 11/1809; B60L 11/1811; B60L 11/1812; B60L 11/1816; B60L 11/182; B60L 11/1829; B60L 11/1831; H01F 38/14; H02J 5/00; H02J 5/005; H02J 7/025; H02J 17/00; H02J 50/00; H02J 50/10; H02J 50/12; H02J 50/40; H04B 5/0037; H04B 5/0075; H04B 5/0081; H04B 5/0087; Y02T 90/10; Y02T 90/122
USPC ........................................................ 307/104
See application file for complete search history.

(56) References Cited

U.S. PATENT DOCUMENTS

| | | | | |
|---|---|---|---|---|
| 8,248,027 B2 * | 8/2012 | Sakoda | ................... | H02J 5/005 307/104 |
| 8,338,990 B2 * | 12/2012 | Baarman | ................. | H01F 38/14 307/104 |
| 8,432,066 B2 * | 4/2013 | Takada | ................ | G06F 17/5063 307/104 |
| 9,054,542 B2 * | 6/2015 | Baarman | ................. | H02J 5/005 |

(Continued)

*Primary Examiner* — Levi Gannon
(74) *Attorney, Agent, or Firm* — Renner Kenner Greive Bobak Taylor & Weber

(57) ABSTRACT

The present invention provides an apparatus for wireless power transfer including three or more coils, each coil defining a respective coil plane, and the coils being arranged in one or more power flow paths whereby each coil can be magnetically coupled to one or more of the other coils thereby to wirelessly transfer power along the one or more power flow paths. The present invention also provides a method for wirelessly transferring power, the method including: providing three or more coils, each coil defining a respective coil plane; and arranging the coils in one or more power flow paths whereby each coil can be magnetically coupled to one or more of the other coils thereby to wirelessly transfer power along the one or more power flow paths.

10 Claims, 14 Drawing Sheets

(56) References Cited

U.S. PATENT DOCUMENTS

| | | | |
|---|---|---|---|
| 9,257,850 B2* | 2/2016 | Sato | H02J 5/005 |
| 2008/0262292 A1 | 10/2008 | Abraham-Fuchs et al. | |
| 2009/0015075 A1* | 1/2009 | Cook | H04B 5/0037 |
| | | | 307/149 |
| 2009/0033280 A1 | 2/2009 | Choi et al. | |
| 2009/0153273 A1 | 6/2009 | Chen et al. | |
| 2009/0230777 A1 | 9/2009 | Baarman et al. | |
| 2010/0045114 A1* | 2/2010 | Sample | H02J 5/005 |
| | | | 307/104 |
| 2010/0052431 A1* | 3/2010 | Mita | B60L 11/182 |
| | | | 307/104 |
| 2010/0201316 A1* | 8/2010 | Takada | B60L 11/182 |
| | | | 320/108 |
| 2010/0259217 A1 | 10/2010 | Baarman et al. | |
| 2011/0181120 A1* | 7/2011 | Liu | H01F 38/14 |
| | | | 307/104 |
| 2012/0010079 A1* | 1/2012 | Sedwick | H03B 15/003 |
| | | | 505/163 |
| 2012/0153739 A1* | 6/2012 | Cooper | H02J 5/005 |
| | | | 307/104 |
| 2012/0161541 A1* | 6/2012 | Urano | H02J 17/00 |
| | | | 307/104 |
| 2012/0235502 A1* | 9/2012 | Kesler | H03H 7/40 |
| | | | 307/104 |

* cited by examiner

--PRIOR ART--

--PRIOR ART--

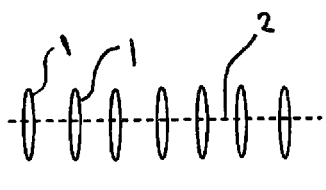
Fig. 7a Straight chain
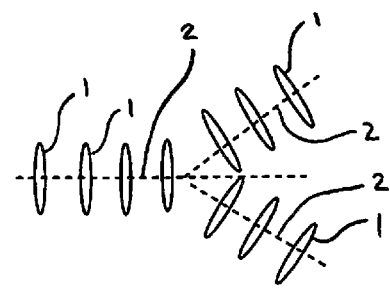
Fig. 7c one chain splitting into two
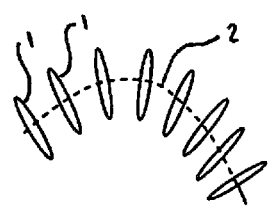
Fig. 7b Curved chain
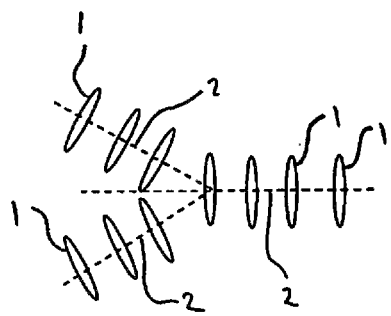
Fig. 7d two chains emerging into one

APPARATUS AND METHOD FOR WIRELESS POWER TRANSFER

FIELD OF THE INVENTION

The present invention relates to apparatuses and methods for wireless power transfer, and in particular, but not limited to, those using non-radiative (near-field) magnetic coupling of coils.

BACKGROUND OF THE INVENTION

Wireless power transfer based on electromagnetic resonance and near-field coupling of two loop resonators was first reported by Nicola Tesla in the 1880's. See U.S. Pat. No. 645,576 to Nikola Tesla, dated 20 Mar. 1900 and titled "Systems of Transmission of Electrical Energy". Wireless power transfer can generally be classified as radiative and non-radiative.

Radiative power transfer relies on the high-frequency excitation of a power source. Radiative power is emitted from an antenna and propagates through a medium, such as air, over a long distance, that is, many times larger than the dimension of the antenna, in the form of electromagnetic waves.

Non-radiative wireless power transfer relies on the near-field electromagnetic coupling of conductive loops, which can also be referred to as coils or conductive coils. Energy is transferred over a relatively short distance, that is, of the order of the dimension (such as the diameter) of the coupled coils.

For efficient wireless power transfer, Tesla showed that using the magnetic resonance of the coupled coils could achieve high energy efficiency. In his experiment, Tesla used a conductive coil (which is a form of air-core inductor) connected in series with a Leyden jar (which is a form of capacitor) to form a loop resonator. He excited one loop (primary coil) as the power transmitter and used a second loop resonator (secondary coil) as a power receiver. See the text titled "The man who invented the twentieth century—Nikola Tesla—Forgotten Genius of Electricity" by Robert Lomas, page 146, published by Headline in 1999 (ISBN 0 7472 6265 9).

The same use of two coupled coils for contactless energy transfer, as shown schematically in FIG. 1, has attracted much interest in the last two decades. For example, research studies on the wireless charging of batteries for electric vehicles always use a primary coil and a secondary coil. For movable industrial robots used in production lines, the use of the power cable is a nuisance. The inductive power transfer (IPT) systems for wirelessly charging industrial robots consist of a primary coil and a secondary coil coupled to each other. The coils can be in the form of concentrated windings or spiral windings. For battery charging applications, the distance between the primary and secondary coils is usually smaller than the dimension of the primary and secondary coils. The ratio of transmission distance d and the radius of the coils r is less than two, that is, $d/r<3$.

Such a relatively short distance is termed "short-range" wireless power transfer. For high-power applications of several kilo-Watts, the operating frequencies for wireless power transfer for electric vehicles and industrial robots are typically in the several tens of kilo-Hertz. The primary circuit and the secondary circuits are usually resonant circuits in order to maximize energy transfer, being a principle set out a century ago by Tesla. For "short-range" applications, typical energy efficiencies in the range of 80% to 95% can be achieved.

The wireless power transfer experiment carried out by a team from MIT and described in U.S. Pat. No. 7,825,543B2 to A. Karalis et al, dated November 2010 and titled "Wireless Energy Transfer", and in the reference titled "Wireless Power Transfer via Strongly Coupled Magnetic Resonances" by Andre Kurs et al in Science, Vol. 317, 6 Jul. 2007, pages 83 to 86, is essentially based on the magnetic coupling and resonance principles laid down by Tesla. The MIT team used two coupled loop resonators, that is, one transmitter coil and one receiver coil, except that they emphasized that the distance d between the two coils is much greater than the dimension of the receiver coil, and more particularly the radius r of the circular receiver coil.

This is termed "mid-range" wireless power transfer in which the ratio of d to r is greater than 3, that is, $d/r>3$. In order to enable reasonable power transfer over "mid-range" distances, a high quality factor $Q=\omega L/R_{ac}$ is needed, where $\omega=2\pi f$ is the angular frequency, L is the inductance, and $R_{ac}$ is the resistance of the loop resonator at the operating frequency f. To increase the energy efficiency, the MIT team used an operating frequency of 10 MHz. For the MIT system with a coil radius r of 30 cm and a transmission distance d of 2.4 m, that is, a ratio of d/r of 8, the MIT team reported an energy efficiency of 40%. Again, the two coupled resonators as previously proposed by Tesla were used in the MIT work.

For mid-range wireless power transfer with $d\gg r$, it has been pointed out in both theory and practical verification that the energy efficiency between two coupled resonators is inversely proportional to $d^3$. See the reference titled "Wireless Power Transfer Using Weakly Coupled Magnetostatic Resonators" by Jose Oscar Mur-Miranda et al in IEEE ECCE Conference, 2010, pages 4179 to 4186. This important finding indicates that the efficiency will decrease exponentially with increasing transmission distance d. This fact is confirmed by the measured energy efficiency of 40% in the reference titled "Wireless Power Transfer via Strongly Coupled Magnetic Resonances" by Andre Kurs et al in Science, Vol. 317, 6 Jul. 2007, pages 83 to 86. A typical graphical relationship of the energy efficiency versus transmission distance is shown in FIG. 2.

Besides wireless power transfer, research on metamaterials and waveguides for wave propagation and signal transfer applications has led to magneto-inductive waveguide devices, which are based on the use of a series of coupled LC loop resonators set up in a chain "with the loop planes perpendicular to an axis of wave propagation" as shown in FIGS. 3a to 3d. See the reference titled "Magneto-inductive waveguide devices" by R. Syms et al in IEE Proceedings—Microwave, Antennas Propagation, Vol. 153, No. 2, April 2006, pages 111 to 121, and the reference titled "A theory of metamaterials based on periodically loaded transmission lines: Interaction between magnetoinductive and electromagnetic waves" by R. Syms et al in Journal of Applied Physics, 97, 064909 (2005). Based on his previous work, R. Syms developed a magneto-inductive waveguide based on loop resonators printed on printed-circuit-boards (PCBs) as shown in FIG. 3d. See the reference titled "Thin-film magneto-inductive cables" by R. Syms et al in Journal of Physics D: Applied Physics, 43 (2010).

A major limitation of these waveguides, however, is that the loop resonators must be spaced a specific uniform distance apart. That is to say, there is an equal distance between each pair of adjacent loop resonators, the value of which has been specifically calculated in accordance with the characteristics of the particular loop resonators.

In the reference titled "Magneto-inductive waveguide devices" by R. Syms et al in IEE Proceedings—Microwave, Antennas Propagation, Vol. 153, No. 2, April 2006, pages 111 to 121, R. Syms also demonstrated that these waveguides can be split into more than one signal channel. An example of a 3-port signal power splitter is shown in FIG. 4, together with a graph showing the performance of such a device.

Due to the high-frequency, that is, greater than 100 MHz, and wave propagation properties in a transmission line environment, transmitted and reflected waves have to be considered together in this type of structure. Waveguides are designed for wave propagation and the operating frequencies are in the order of 100 MHz and above. Such high-frequency operation inevitably increases the AC resistance of the coils, which makes them less suitable for power transfer applications. It is also important to note that existing waveguides are essentially stationery systems. This means that all the coils are in fixed positions.

It is an object of the present invention to overcome or ameliorate at least one of the disadvantages of the prior art, or to provide a useful alternative.

SUMMARY OF THE INVENTION

The present invention provides, in a first aspect, an apparatus for wireless power transfer including three or more coils, each coil defining a respective coil plane, and the coils being arranged in one or more power flow paths whereby each coil can be magnetically coupled to one or more of the other coils thereby to wirelessly transfer power along the one or more power flow paths.

Preferably, one or more of the coils can be configured such that the respective coil plane deviates from being perpendicular to the power flow path in which it is arranged, thereby varying the mutual inductance between the one or more coil and an adjacent coil.

Preferably, one or both of the resonant frequency and the impedance of one or more of the coils can be varied. Preferably, one or more of the coils has a capacitance or an inductance or both thereof, and the resonant frequency of the one or more coils can be varied by varying the capacitance or the inductance or both thereof.

Preferably, one or more of the power flow paths split into further power flow paths. Preferably, two or more of the power flow paths merge into fewer power flow paths. Preferably, one or more of the power flow paths are straight, curved, circular, irregular-shaped, or any combination thereof.

In one embodiment, the coils form part of a tubular structure. Preferably, the tubular structure is flexible.

Preferably, one or more of the coils are adapted to receive power from a power supply, the power being wirelessly transferable along one or more of the power flow paths via mutual induction between the coils. Preferably, one or more of the coils are adapted to provide power to a power consuming device.

Preferably, the magnetic coupling between two or more of the coils is resonant. Preferably, the magnetic coupling between the coils is non-radiative.

In one embodiment, the ratio of the distance between any two of the coil planes and half the maximum dimension of any of said two coil planes is less than 3.

In another embodiment, the distance between a pair of the coil planes is unequal with the distance between another pair of the coil planes.

In a further embodiment, the respective distances between different pairs of the coil planes are selected to maximize the efficiency of the wireless power transfer.

In various embodiments, the coils have an operating frequency of less than 100 MHz, less than 10 MHz, less than 5 MHz, and less than 1 MHz, respectively.

In another embodiment, the coils have an operating frequency of greater than 10 kHz.

In a second aspect, the present invention provides a method for wirelessly transferring power, the method including: providing three or more coils, each coil defining a respective coil plane; and arranging the coils in one or more power flow paths whereby each coil can be magnetically coupled to one or more of the other coils thereby to wirelessly transfer power along the one or more power flow paths.

Preferably, the method includes configuring one or more of the coils such that the respective coil plane deviates from being perpendicular to the power flow path in which it is arranged, thereby varying the mutual inductance between the one or more coil and an adjacent coil.

Preferably, the method includes varying one or both of the resonant frequency and the impedance of one or more of the coils. Preferably, one or more of the coils has a capacitance or an inductance or both thereof, and the method includes varying the capacitance or the inductance or both thereof, thereby to vary the resonant frequency of the one or more coils.

Preferably, the coils are arranged such that one or more of the power flow paths split into further power flow paths. Preferably, the coils are arranged such that two or more of the power flow paths merge into fewer power flow paths. Preferably, the coils are arranged such that one or more of the power flow paths are straight, curved, circular, irregular-shaped, or any combination thereof.

In one embodiment, the coils are provided as part of a tubular structure. Preferably, the tubular structure is flexible.

Preferably, one or more of the coils are adapted to receive power from a power supply, the power being wirelessly transferable along one or more of the power flow paths via mutual induction between the coils. Preferably, one or more of the coils are adapted to provide power to a power consuming device.

Preferably, two or more of the coils are configured such that the magnetic coupling between said coils is resonant. Preferably, the coils are configured such that the magnetic coupling between the coils is non-radiative.

In one embodiment, the coils are arranged such that the ratio of the distance between any two of the coil planes and half the maximum dimension of any of said two coil planes is less than 3.

In another embodiment, the coils are arranged such that the distance between a pair of the coil planes is unequal with the distance between another pair of the coil planes.

In a further embodiment, the coils are arranged such that the respective distances between different pairs of the coil planes are selected to maximize the efficiency of the wireless power transfer.

In various embodiments, the coils are provided with an operating frequency of less than 100 MHz, less than 10 MHz, less than 5 MHz, less than 1 MHz, respectively.

In another embodiment, the coils are provided with an operating frequency of greater than 10 kHz.

BRIEF DESCRIPTION OF THE FIGURES

Preferred embodiments in accordance with the best mode of the present invention will now be described, by way of example only, with reference to the accompanying figures, in which:

FIG. 7a is a schematic diagram of an apparatus for wireless power transfer in accordance with another embodiment of the present invention, in which the coils are arranged in a straight power flow path;

FIG. 7b is a schematic diagram of an apparatus for wireless power transfer in accordance with yet another embodiment of the present invention, in which the coils are arranged in a curved power flow path;

FIG. 7c is a schematic diagram of an apparatus for wireless power transfer in accordance with yet another embodiment of the present invention, in which the coils are arranged in a power flow path that splits into two further power flow paths;

FIG. 7d is a schematic diagram of an apparatus for wireless power transfer in accordance with a further embodiment of the present invention, in which the coils are arranged in two power flow paths that merge into one power flow path;

DETAILED DESCRIPTION OF THE BEST MODE OF THE INVENTION

Figure 1:
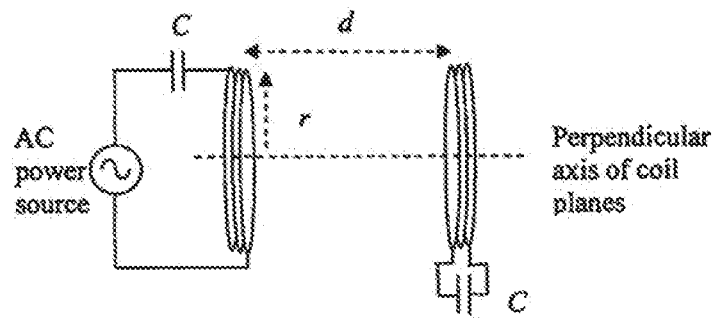
FIG. 1 is a schematic diagram of a pair of loop resonators of the prior art.
Figure 2:
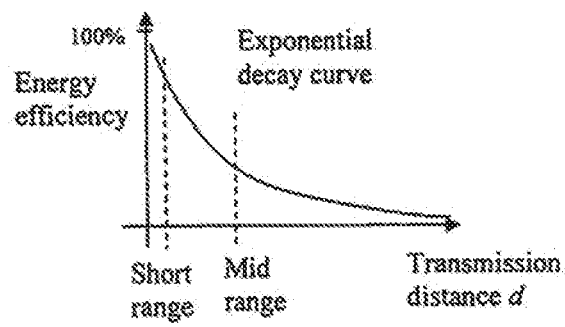
FIG. 2 is a graph showing the typical exponential decay of energy efficiency as a function of transmission distance for wireless power transfer.
Figure 3A:
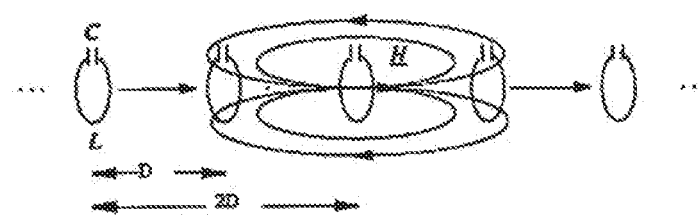
FIGS. 3a to 3c are schematic diagrams of a magneto-inductive waveguide of the prior art for signal transmission.
Figure 3B:
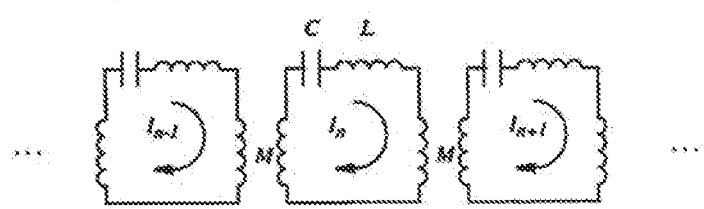
Figure 3C:
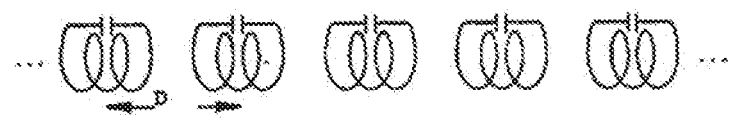
Figure 3D:
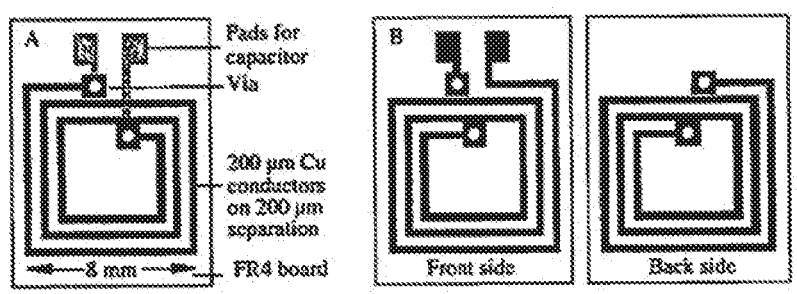
FIG. 3d is a schematic diagram of PCB loop resonators used in the waveguide of FIGS. 3a to 3c.
Figure 4A:
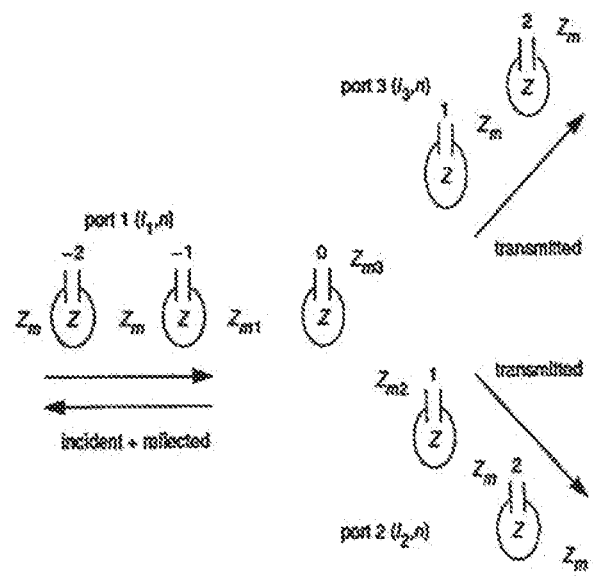
FIG. 4 shows schematic diagrams of a magneto-inductive 3-port signal power splitter of the prior art, together with a graph showing the performance of the signal power splitter.
Figure 4B:
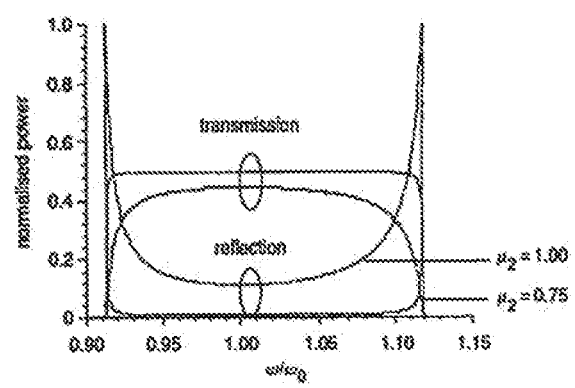

Following on from the discussion of the background of the present invention, the limitations of existing methods for wireless power or signal transfer can be identified as follows:

(1) The use of only a pair of loop resonators has limitations either in terms of distance for the "short-range" method or in terms of energy efficiency for the "mid-range" method.

(2) The use of high-frequency operation in excess of 100 MHz in the waveguide research discussed above could increase the AC resistance of the coupled coils, and therefore, reduces the energy efficiency if it is used for power transfer applications.

(3) In designing waveguides for the purposes of wave propagation, the dimension of the loop resonator is inversely proportional to the operating frequency. Therefore, the operating frequency has to be very high, that is, well above 100 MHz, in order to reduce the size of the loop resonators. However, for power transfer via a coupled magnetic field, this use of very high frequency, that is, greater than 100 MHz, can be avoided.

(4) In the 3 methods described above, there is no variable control of the power flow except for control from the power source. No mechanism has been proposed to vary the power flow along the power flow paths.

Referring to FIGS. 6 to 20, preferred embodiments of the present invention provide an apparatus for wireless power transfer including three or more coils 1, each coil 1 defining a respective coil plane, and the coils being arranged in one or more power flow paths 2 whereby each coil can be magnetically coupled to one or more of the other coils thereby to wirelessly transfer power along the one or more power flow paths.

The magnetic coupling between two or more of the coils is preferably resonant. In particular, the magnetic coupling is at a resonant frequency shared by the two or more coils. In one embodiment, all of the coils are magnetically coupled at a resonant frequency.

It will be appreciated that the terms "coil", "loop", "winding" and other similar terms are interchangeable, as understood by those skilled in the art. Similarly, coils that can be operated at a resonant frequency can be termed "resonators", "coil resonators", "loop resonators", "winding resonators", or other similar terms, as understood by those skilled in the art. Further, it will be appreciated that coils arranged in a power flow path can also be termed a "chain of coils", "chain of loops", or "chain of windings".

The coils can be made of any conductive material. The coils can also be made from a superconductive material so that there are no conduction losses.

Returning to the preferred embodiments of the present invention, the coils allow power to be wirelessly transferred along the one or more power flow paths via mutual induction between the coils.

In particular, one or more of the coils are adapted to receive power from a power supply 3, the power being wirelessly transferable along one or more of the power flow paths via mutual induction between the coils. Also, one or more of the coils are adapted to provide power to a power consuming device. In one embodiment, each coil acts as an AC voltage source, and thereby, a power source.

In some embodiments, such as that shown in FIG. 7c, one or more of the power flow paths splits into further power flow paths. In FIG. 7c specifically, one power flow path splits into two power flow paths. In other embodiments, such as that shown in FIG. 7d, two or more of the power flow paths merge into fewer power flow paths. In FIG. 7d specifically, two power flow paths merge into one power flow path.

One or more of the power flow paths are straight (see, for example, FIG. 7a), curved (see, for example, FIG. 7b), circular, irregular-shaped, or any combination thereof.

Thus, many different networks of power flow paths ranging from the simple to the more complex with multiple branches splitting into further branches and/or merging into fewer power flow paths, in which the power flow paths can also be of a variety of shapes, are possible in accordance with embodiments of the present invention.

Figure 20:
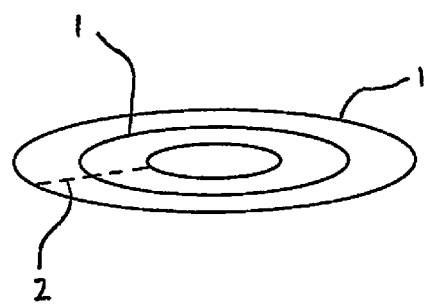
FIG. 20 is a schematic diagram of an apparatus for wireless power transfer in accordance with a further embodiment of the present invention.

In a further embodiment, as depicted in FIG. 20, the coils are of different sizes and are arranged concentrically. In particular, the coils are circular, are of increasing diameter, and are arranged concentrically in a common plane. The power flow path in this embodiment is radial from the smallest diameter coil to the largest diameter coil on the outside.

In one embodiment, one or more of the coils can be configured such that the respective coil plane deviates from being perpendicular to the power flow path in which it is arranged, thereby varying the mutual inductance between the one or more coil and an adjacent coil. This thereby controls the power flow, or the amount of power transferred wirelessly, along the one or more power flow paths.

Figure 8A:
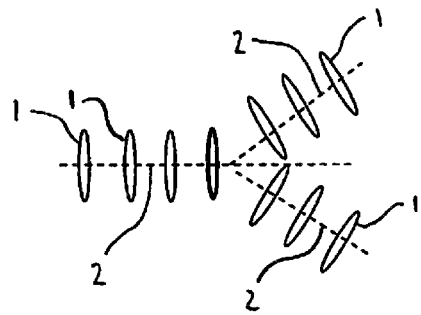
FIGS. 8a to 8c are schematic diagrams of an apparatus for wireless power transfer in accordance with an embodiment of the present invention, in which one of the coils (shown bolded) is configured to deviate from being perpendicular to the power flow path in which it is arranged, thereby controlling the power being transferred.
Figure 8B:
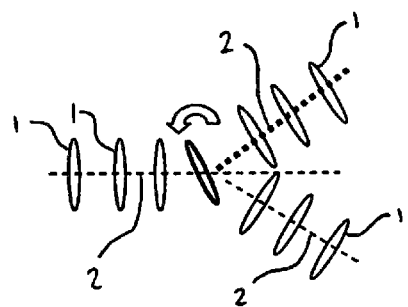
Figure 8C:
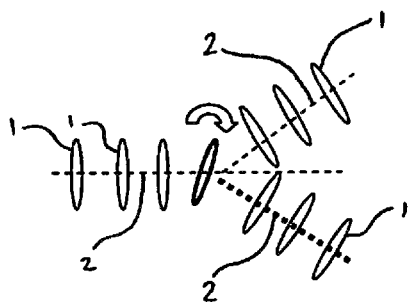

As shown in FIGS. 8a to 8c, the coils are arranged in one power flow path that splits into two power flow paths, that is, one main path that splits into two branch paths, an upper branch path and a lower branch path. The last coil (shown bolded in FIGS. 8a to 8c) in the main path before it splits into the two branch paths can be rotated about an axis that passes through the last coil and is perpendicular to the main and branch paths. Thus, the coil plane of the last coil deviates from being perpendicular to the power flow path in which it is arranged, thereby varying the mutual inductance between the one or more coil and an adjacent coil. More particularly, in FIG. 8b, the coil plane of the last coil is rotated towards the upper branch path (shown bolded in FIG. 8b), resulting in a larger power flow in the upper branch path relative to the lower branch path. In FIG. 8c, the coil plane of the last coil is rotated towards the lower branch path (shown bolded in FIG. 8c), resulting in a larger power flow in the lower branch path relative to the upper branch path.

In another embodiment, one or both of the resonant frequency and the impedance of one or more of the coils can be varied. In one embodiment, one or more of the coils has a capacitance and the resonant frequency of the one or more coils can be varied by varying the capacitance. In another embodiment, one or more of the coils has an inductance and the resonant frequency of the one or more coils can be varied by varying the inductance. Again, this thereby controls the power flow, or the amount of power transferred wirelessly, along the one or more power flow paths.

Figure 9A:
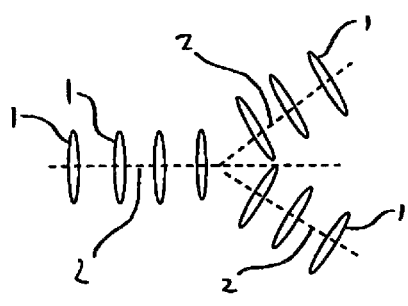
FIGS. 9a to 9c are schematic diagrams of an apparatus for wireless power transfer in accordance with another embodiment of the present invention, in which one or both of the resonant frequency and the impedance of two of the coils (shown dashed) is varied, thereby controlling the power being transferred.
Figure 9B:
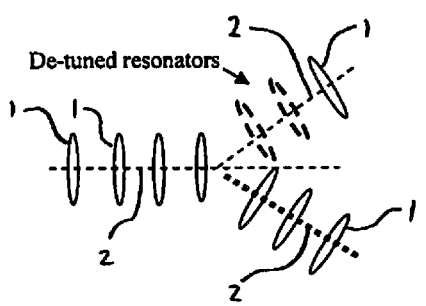
Figure 9C:
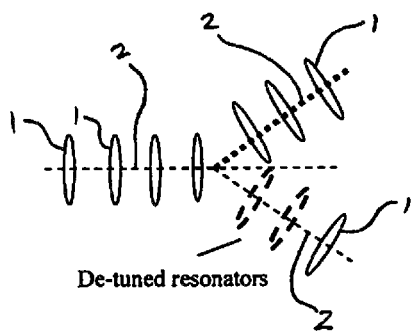

As shown in FIGS. 9a to 9c, the coils are arranged in one power flow path that splits into two power flow paths, that is, one main path that splits into two branch paths, an upper branch path and a lower branch path. Referring to FIG. 9b, one or both of the resonant frequency and the impedance of the first two coils (shown dashed in FIG. 9b) in the upper branch path are varied to "de-tune" or "decouple" the first two coils in the upper branch path. This subsequently results in a larger power flow in the lower branch path (shown bolded in FIG. 9b) relative to the upper branch path. Conversely, referring to FIG. 9c, one or both of the resonant frequency and the impedance of the first two coils (shown dashed in FIG. 9c) in the lower branch path are varied to "de-tune" or "decouple" the first two coils in the lower branch path. This subsequently results in a larger power flow in the upper branch path (shown bolded in FIG. 9c) relative to the lower branch path.

Thus, the two foregoing embodiments represent two power flow control methods that can be utilized in embodiments of the present invention.

Figure 10:
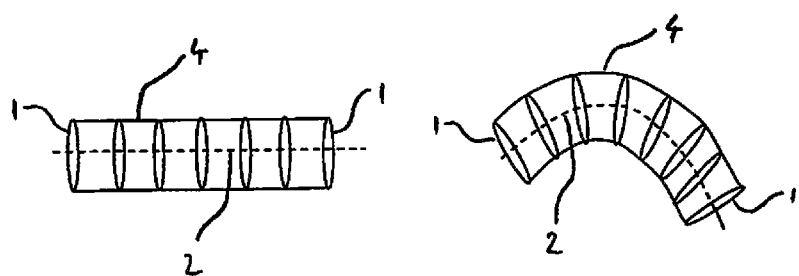
FIG. 10 shows schematic diagrams of an apparatus for wireless power transfer in accordance with yet another embodiment of the present invention, in which the coils form part of a flexible tubular structure.

In another embodiment shown in FIG. 10, the coils form part of a tubular structure 4. Preferably, the tubular structure is flexible. The flexible tubular structure can in this way form a new type of power cable having a hollow centre. Since no conductive material, such as copper, is required to fill the core of this new type of cable, much less conductive material is required. Also, the conductive material need not be continuous. Further, there is inherent electrical isolation between the two ends of this new type of cable.

In preferred embodiments, the magnetic coupling between the coils is non-radiative. That is to say, near-field or short-range magnetic coupling is employed. In some embodiments, the ratio of the distance between any two of the coil planes and half the maximum dimension of any of said two coil planes is less than 3. The distance between any two of the coil planes is also termed the "transmission distance" between the two coils.

In the embodiments depicted in FIGS. 6 to 9, the coils are circular, substantially identical, and are spaced a uniform distance apart from each other. Therefore, half the maximum dimension of any of the coil planes is the radius r. The transmission distance is labeled as d in the figures.

Although the embodiments depicted in FIGS. 6 to 9 show coils that are spaced a uniform distance apart from each other, this need not be the case. In other embodiments, the distance between a pair of the coil planes is unequal with the distance between another pair of the coil planes. In further embodiments, the respective distances between different pairs of the coil planes are selected to maximize the efficiency of the wireless power transfer. In one embodiment described in further detail below, the respective distances between different pairs of the coil planes are calculated, and thereby selected, to maximize the efficiency of the wireless power transfer. In fact, as will be described in further detail below, unequal respective distances between different pairs of the coil planes can maximize the efficiency of the wireless power transfer in certain applications.

Thus, the distance between any pair of the coil planes can vary with respect to any other pair of the coil planes. To remove any doubt, one pair of the coil planes can include one coil plane that is the same coil plane that forms part of another pair of the coil planes, that is, two different pairs of the coil planes can share one common coil plane.

The features above in respect of the relative distances between coils can of course be combined. In particular, in some embodiments, the ratio of the distance between any two of the coil planes and half the maximum dimension of any of said two coil planes is less than 3, and the distance between a pair of the coil planes is unequal with the distance between another pair of the coil planes. In other embodiments, the ratio of the distance between any two of the coil planes and half the maximum dimension of any of said two coil planes is less than 3, and the respective distances between different pairs of the coil planes are selected to maximize the efficiency of the wireless power transfer.

In various embodiments, the coils have an operating frequency of less than 100 MHz, 10 MHz, 5 MHz, or 1 MHz.

These ranges for operating frequencies advantageously result in low AC resistances in the coils, high quality factors, and low conduction losses, thereby improving the transmission energy efficiency. This is discussed further below. In embodiments where the magnetic coupling between two or more of the coils is resonant, the resonant frequency shared by the two or more coils can be within these ranges, resulting in the same advantages above. In other embodiments, the coils have an operating frequency of greater than 10 kHz. This advantageously results in frequencies above the audible range. In further embodiments, these frequency ranges can be combined, that is, the coils of further embodiments can have an operating frequency of between 10 kHz and one of 100 MHz, 10 MHz, 5 MHz, or 1 MHz.

The present invention also provides a method for wirelessly transferring power. The method includes: providing three or more coils, each coil defining a respective coil plane; and arranging the coils in one or more power flow paths whereby each coil can be magnetically coupled to one or more of the other coils thereby to wirelessly transfer power along the one or more power flow paths.

Preferred embodiments of the method include those that have already been described above. These include those that utilize the coils described above, and that arrange and configure the coils as described above.

The following provides additional details, features, and advantages of the embodiments described above and further embodiments in respect of the present invention.

In view of the above description, some embodiments of the present invention utilize a series of resonant magnetically coupled coils or "loop resonators" arranged in one or more power flow paths, thereby forming so-called "domino chains" or "domino resonator chains". The coupled loop resonators are placed in the "short-range" regime where the energy efficiency is high. The "short-range" domino chain arrangement enables a longer overall transmission distance (for a given d/r ratio) between the power source resonator (i.e. the coil connected to a power supply) and the end receiver loop resonator (i.e. the last coil at an end of the power flow path away from the power source) where a load is connected, despite the use of more than two loop resonators.

Figure 5:
FIG. 5 is a schematic diagram of an apparatus of the prior art for wireless power transfer, which uses a pair of magnetically coupled coils.
Figure 6:
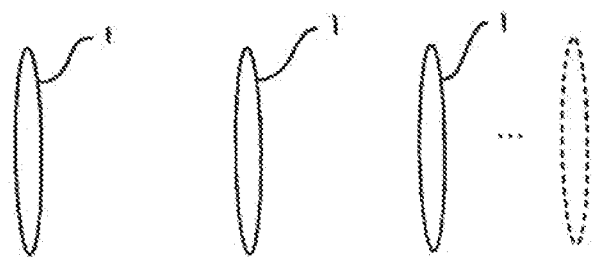
FIG. 6 is a schematic diagram of an apparatus for wireless power transfer in accordance with an embodiment of the present invention.

This advantage is illustrated by comparing the prior art apparatus shown in FIG. 5, which utilizes a pair of loop resonators, and the general embodiment of the present invention shown in FIG. 6, where three or more loop resonators are utilized.

While the proposed domino resonator chain can be used at high frequency above the Mega-Hertz level, the use of a relatively large capacitor in each loop resonator can reduce the resonance frequency to the sub-Mega-Hertz region, if necessary, so as to reduce the AC resistance of the coils and increase the quality factor $Q=\omega L/R_{ac}$. A high Q value improves the transmission energy efficiency. This allows the minimization of $R_{ac}$ for power transfer, and thus, the $i^2 R_{ac}$ conduction loss.

The use of the domino chain arrangement of the loop resonators enables the control of the power in a highly flexible manner. As described above, straight, curved, circular, even irregularly-shaped domino paths, or a combination thereof can easily be formed to direct the power flow to targeted locations. The resonant capacitor voltage of each resonator becomes an AC voltage source. Also as described above, a single power domino chain can be split into several chains. Several domino chains can also merge into one domino chain. See FIGS. 7c and 7d.

Two power flow control methods were described above. An embodiment of the first method is control via the angle of the central axis of the loop plane. The angle of the central axis of the loop resonator can be altered in order to change the mutual inductance between adjacent coupled loop resonators as a means of power flow control. If the coupled loop planes are parallel with the axis of the power flow, this angle is zero. This method can be used within a single domino chain or at the junctions of domino chains, as shown in FIGS. 8a to 8c.

An embodiment of the second method is control via the resonant frequency of the loop resonators, by controlling, for example, the impedance of the loop resonators. The impedance can in turn be controlled by controlling a capacitance and/or an inductance of the loop resonators. Since efficient power transfer is only feasible if the loop resonators have the same resonant frequency, by de-tuning or decoupling one or more loop resonators in a section of a power domino chain, the impedance can be altered to vary the power flow, as illustrated in FIGS. 9a to 9c. As out-of-tuned loop resonators have a high equivalent impedance, the control of the resonant frequency provides a simple means to control power flow. Means of altering the resonant frequency of a loop resonator include, but are not limited to, adding or reducing the capacitance of the loop resonators, or adding or reducing the inductance of the loop resonators.

The use of a network of power domino resonators essentially provides a power network because the capacitor in each loop resonator provides an AC voltage source. It is analogous to the power sockets used in a domestic electrical system.

As noted above, if a chain of coupled loop resonators is enclosed in a flexible tubular structure, it forms a power cable which can allow power transfer at a particular resonant frequency without a continuous conductive material such as copper. This is a new form of power cable that has inherent electrical isolation between the two ends of the cable. See FIG. 10. It requires much less conductive material, such as copper, and is suitable for power transfer at a particular resonant frequency of the cable.

As an example, in one particular embodiment, such a power cable can be used in microsurgery, where the power cable can be used to treat tumors in a patient. This can be done by operating the coils at a resonant frequency that matches the resonant frequency of a tumor.

As mentioned above, it is noted that while an "equal-distance arrangement" of the loop resonators, where the loop resonators are spaced a uniform distance apart (i.e. the respective distances between different pairs of the loop resonators are equal), is an easy and general approach, an optimized "unequal-distance arrangement", where the distance between loop resonators varies (i.e. the distance between a pair of the loop resonators is unequal with the distance between another pair of the loop resonators), can in fact improve the overall energy efficiency in some specific applications.

Figure 18:
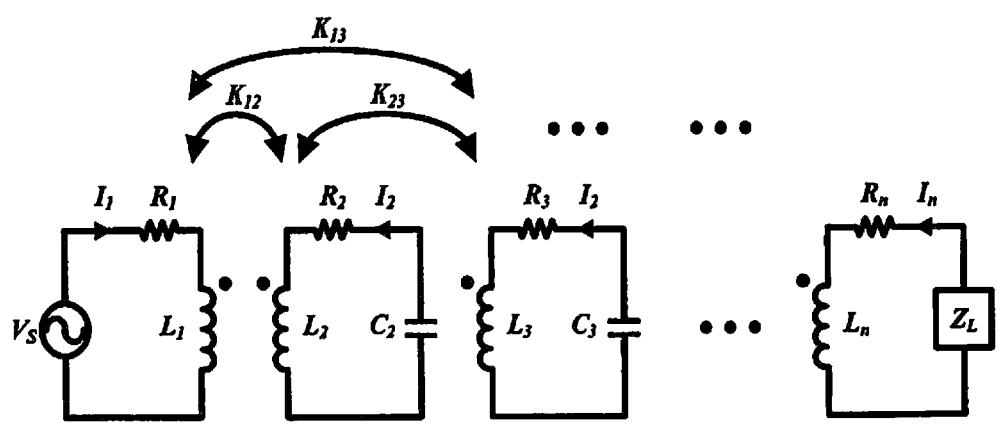
FIG. 18 is a schematic diagram of a circuit model of an apparatus for wireless power transfer in accordance with an embodiment of the present invention.
Figure 19:
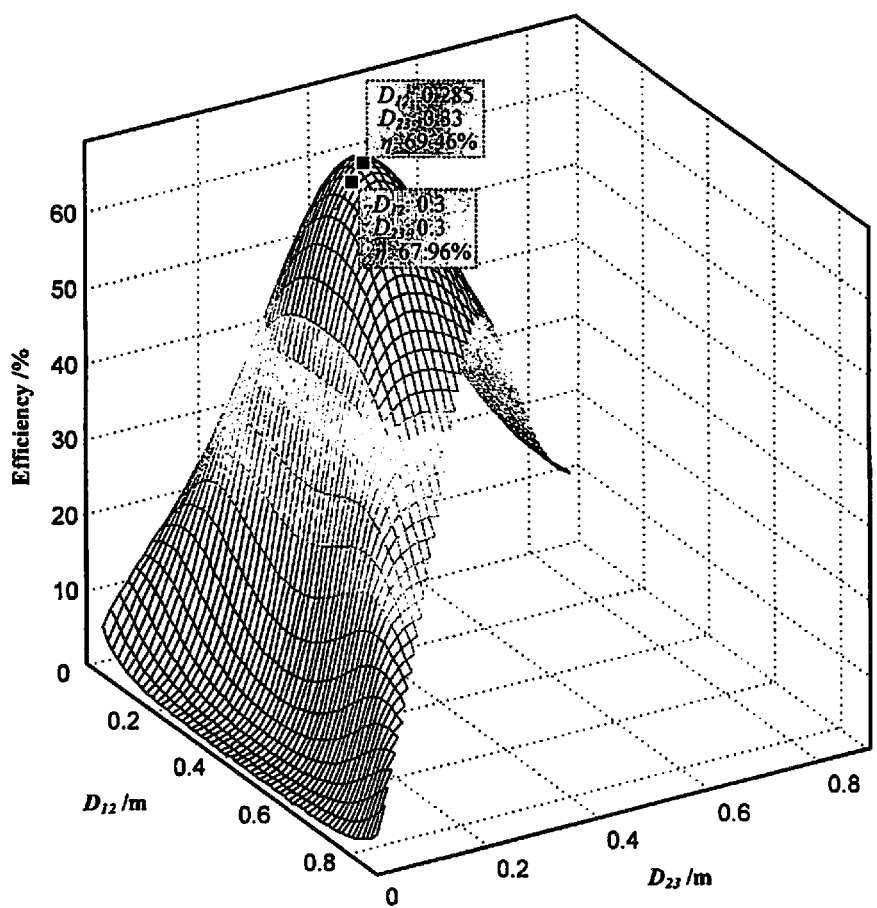
FIG. 19 is a graph of the efficiency against different respective distances between the pairs of coils of the embodiment shown in FIG. 18.

Referring to FIGS. 18 and 19, an embodiment using the "unequal-distance arrangement" referred to above will now be described.

FIG. 18 shows the circuit model of an n-winding wireless power transfer (WPT) system according to an embodiment of the present invention, where each winding is represented by the subscript number from 1 to n. $Z_L$ ($Z_L=R_L+jX_L$) represents the load impedance including the compensating capacitor for winding-n. In the following discussion, it is assumed that all the windings except winding-1 are resonant. Winding-1 resonance will not affect the efficiency of the system but will decrease the VA rating of the power supply. Therefore, in practice operation, winging-1 is also resonant.

With the help of the circuit model in FIG. 18, the relationship among the currents in the windings can be expressed by the following equation:

$$\begin{bmatrix} j\omega M_{12} & R_2 & j\omega M_{23} & j\omega M_{24} & \ldots & \ldots & \ldots & j\omega M_{2n} \\ j\omega M_{13} & j\omega M_{23} & R_3 & j\omega M_{34} & \ldots & \ldots & \ldots & j\omega M_{3n} \\ \vdots & \vdots & \vdots & \vdots & \ddots & \vdots & \vdots & \vdots \\ j\omega M_{1(n-1)} & \ldots & \ldots & \ldots & \ldots & j\omega M_{(n-2)(n-1)} & R_{(n-1)} & j\omega M_{(n-1)n} \\ j\omega M_{1n} & \ldots & \ldots & \ldots & \ldots & j\omega M_{(n-2)n} & j\omega M_{(n-1)n} & R_n + R_L \end{bmatrix} \cdot \begin{bmatrix} I_1 \\ I_2 \\ \vdots \\ I_{n-1} \\ I_n \end{bmatrix} = 0 \quad (U1)$$

where $M_{ij} = k_{12}\sqrt{L_i L_j}$ (i,j=1, 2, ..., n; i≠j) is the mutual inductance between winding i and winding j and the RL is the load resistance which is connected to winding n.

The following relationships can then be derived by solving this equation:

$$\frac{I_m}{I_n}, m = 1, 2, \ldots, n-1. \quad (U2)$$

Further, the efficiency of the n-winding system can be derived by substituting all the relationships of (U2) into the following equation:

$$\eta = \frac{I_n^2 R_L}{I_1^2 R_1 + I_2^2 R_2 + \ldots + I_n^2(R_n + R_L)} = \frac{R_L}{\left(\frac{I_1}{I_n}\right)^2 R_1 + \left(\frac{I_2}{I_n}\right)^2 R_2 + \ldots + \left(\frac{I_{n-1}}{I_n}\right)^2 R_{n-1} + R_n + R_L}. \quad (U3)$$

Based on equation (U3), the maximum efficiency and the optimum load can be calculated provided that the system is given. For embodiments where all the windings are placed in a straight line, the optimum distances between the windings can be calculated for a given total power transfer distance and a given number of windings.

A simplified model will now be analyzed.

In mid-range wireless power transfer applications, the mutual inductance between every two non-adjacent windings is actually small compared with the mutual inductance between two adjacent windings, and will barely affect the performance of the system. Therefore, a simplified model could be used to study the characteristics of the multi-winding WPT system.

For a simplified model, equation (U1) can be rewritten as:

$$\begin{bmatrix} j\omega M_{12} & R_2 & j\omega M_{23} & & & & \\ & j\omega M_{23} & R_3 & j\omega M_{34} & & & \\ & & & \ddots & & & \\ & & & & j\omega M_{(n-2)(n-1)} & R_{(n-1)} & j\omega M_{(n-1)n} \\ & & & & & j\omega M_{(n-1)n} & R_n + R_L \end{bmatrix} \cdot \begin{bmatrix} I_1 \\ I_2 \\ \vdots \\ I_{n-1} \\ I_n \end{bmatrix} = 0 \quad (U4)$$

The efficiency expression can be derived with the same steps described above.

Then, by solving the equation:

$$\frac{\partial \eta}{\partial R_L} = 0, \quad (U5)$$

we can derive the optimum load and the maximum efficiency, which can be expressed as follows:

$$R_{L\_OPT} = R_n \sqrt{\frac{\sum_{k=1}^{n} A_k^2 \delta_k}{\sum_{k=1}^{n-1} B_k^2 \delta_k}}, \quad (U6)$$

$$\eta_{max} = \frac{\delta_n}{2\sqrt{\left(\sum_{k=1}^{n} A_k^2 \delta_k\right)\left(\sum_{k=1}^{n-1} B_k^2 \delta_k\right)} + 2\sum_{k=1}^{n-1} A_k B_k \delta_k + \delta_n} \quad (U7)$$

where, $$A_k = \sum_{E(k,n)} \prod_{g=k+1}^{n-1} \Delta_{g(g+1)}^{e(g)}, \text{ for } k = 1, 2, \ldots n-2 \text{ and}$$

$$A_{n-1} = 1, A_n = 1;$$

$$B_k = \sum_{E(k,n-1)} \prod_{g=k+1}^{n-2} \Delta_{g(g+1)}^{e(g)}, \text{ for } k = 1, 2, \ldots n-3 \text{ and}$$

$$B_{n-2} = 1, B_{n-1} = 1;$$

$$\delta_k = \prod_{g=1}^{k} \Delta_{(g-1)g}, \text{ for } k = 1, 2, \ldots n;$$

$$E(k, n) = \left\{ \begin{bmatrix} e(k+1), \\ e(k+2), \ldots, \\ e(n-1) \end{bmatrix} \middle| \begin{array}{l} e(m-1)e(m) \neq 1, \\ m = k+1, \ldots, n-2 \end{array} \right\},$$

for $k = 1, 2, \ldots n-2$;

$e(k) \in \{0, 1\}$, for $k = 2, 3, \ldots n-1$;

$$\Delta_{k(k+1)} = k_{k(k+1)}^2 Q_k Q_{k+1} = \frac{\omega^2 M_{k(k+1)}^2}{R_k R_{(k+1)}},$$

for $k = 1, 2, \ldots n-1$ and $\Delta_{01} = 1$.

For identical coaxial circular windings, the analysis is as follows.

Maxwell has derived an equation to calculate the mutual inductance between two coaxial circular filamentary currents:

$$M = \mu_0 \frac{\sqrt{R_1 R_2}}{f}[(2-f^2)K(f) - 2E(f)] \quad (U8)$$

where K(f) and E(f) are complete elliptic integrals of the first and second kind, respectively, and:

$$f = \sqrt{\frac{4R_1R_2}{D^2+(R_1+R_2)^2}}$$

where $R_1$, $R_2$, and D are the radius of winding 1, winding 2 and the distance between them, respectively.

For mid-range wireless power transfer, the mutual inductance of two coaxial circular windings can be calculated accurately by:

$$M = \sum_{i=1}^{n_1}\sum_{j=1}^{n_2} M_{ij} \quad (U9)$$

Therefore, in the n-winding WPT system with identical coaxial circular windings, all the mutual inductances between every two adjacent windings can be calculated using (U9), and by substituting all the mutual inductances into (U7), we can derive the expression of efficiency as a function of the combination of distances in the system as follows:

$$\eta_{max} = f(D_{12}, D_{23}, \ldots, D_{(n-1)n}) \quad (U10)$$

where $D_{ij}$ is the distance between winding i and winding j.

With the help of equation (U10), the optimization of the distances of the windings can be determined provided that the total transfer distance is given.

As an example, the calculations above were made for a 4-winding WPT system in accordance with an embodiment of the present invention, on the basis of a total transfer distance of 0.9 m. The results are shown in the graph of FIG. 19, in which $D_{12}$ represents the distance between winding 1 and winding 2, and $D_{23}$ represents the distance between winding 2 and winding 3. As can be seen, the unequal-distance arrangement ($D_{12}$=0.285 m, $D_{23}$=0.33 m, $D_{34}$=0.285 m) has a higher efficiency than the equal-distance arrangement ($D_{12}$=0.3 m, $D_{23}$=0.3 m, $D_{34}$=0.3 m).

The measured efficiencies were as follows.
4-winding (total distance 0.9 m):
66.33% for the equal-distance arrangement; and
67.69% for the unequal-distance arrangement (0.282 m, 0.336 m, 0.282 m).

As another example, the calculations above were made for a 8-winding WPT system in accordance with another embodiment of the present invention, on the basis of a total transfer distance of 2.1 m.

The measured efficiencies were as follows.
8-winding (total distance 2.1 m):
45.81% for the equal-distance arrangement; and
47.53% for the unequal-distance arrangement (0.259, 0.314, 0.318, 0.318, 0.318, 0.314, 0.259)

In summary, embodiments of the present invention are related to wireless power transfer methods and apparatuses based on non-radiative (near-field) magnetic coupling of conductive coupled loop resonators, whereby these coupled loop resonators are arranged along the path or paths of desired power flow, much like a series of dominoes. Such power flow can be split into or combined from a plurality of power flow channels.

Means of controlling the power flow into split power flow channels can be achieved by altering the angle of the resonator coils and/or changing the resonant frequency of loop resonators in a section of a power flow path by, for example, changing the capacitance, and thus, the impedance of the power flow path.

Existing waveguide technology typically operates at the radiative frequency range of hundreds of Mega-Hertz to tens of Giga-Hertz. Also, in existing waveguide technology, the loop resonator separation is determined by the wavelength of the propagating waves. By contrast, the domino resonators according to embodiments of the present invention can operate at low frequencies from a few tens of kilo-Hertz upwards with flexible resonator separation distances, thereby minimizing the AC resistance and maximizing the quality factor of the coupled coils for power transfer applications with great flexibility.

A unique advantage of this invention is that the magnetically coupled resonators can be flexibly arranged in any form of domino chain arrangements. Further, if a series of magnetically coupled domino resonators are arranged within a flexible tubular enclosure, in accordance with one embodiment of the invention, they form an electrically isolated power cable, or powerguide cable, without a continuous solid conductive material through the cable structure. This new power cable has the unique property that it will not transmit power unless input power excitation is at the resonant frequency of the loop resonators which can be designed accurately.

Practical experimentation has been undertaken to confirm the performance of various embodiments of the present invention. This is described below.

Loop resonators were constructed, with each loop resonator formed by a coil connected in series with a capacitor. The radius of the coil was 15.5 cm. The number of turns of each coil was 8. Inductance L=90 μH, capacitance C=1 nF, resonant frequency was about 520 kHz. The AC winding resistance at this frequency was $R_{ac}$=0.98Ω. The quality factor Q=290. One loop resonator was connected with a power supply 3. A compact fluorescent lamp (CFL) 5 was used as the electric load, that is, the power consuming device was in the form of the CFL 5. The following describes the results of utilizing different arrangements of resonators.

Figure 11:
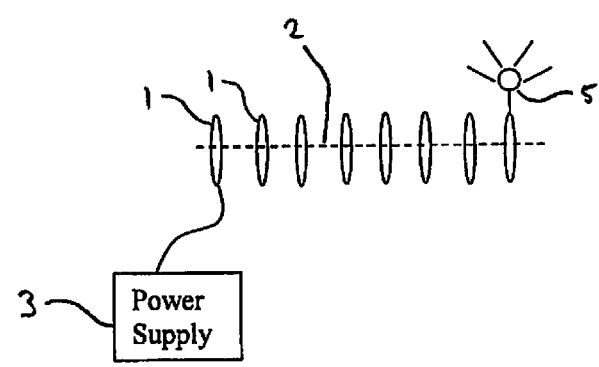
FIGS. 11 to 17 are schematic diagrams of experimental setups of various embodiments of the present invention.

(a) Straight Power Domino Resonator Arrangements with (i) Equal and (ii) Unequal Distance Approaches (i) Equal-Distance Arrangement As shown in FIG. 11, a domino chain comprising 8 resonators spaced apart with equal distances was set up. A 14 W CFL was connected across the capacitor of the last resonator in the chain. The last resonator was excited by a RF-power amplifier at 520 kHz.

(ii) Unequal-Distance Arrangement

Figure 12:
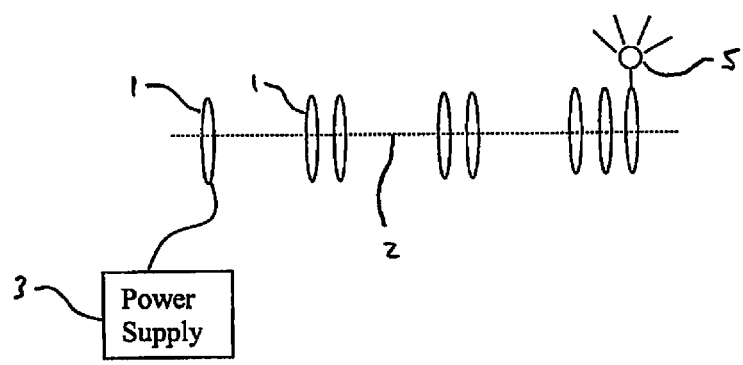

The same experimental setup as above for (i) was repeated with the resonators spaced apart with unequal distances, as shown in FIG. 12. It was demonstrated that the unequal-distance approach is also practical.

(b) L-Shape Power Domino Resonator Arrangement

Figure 13:
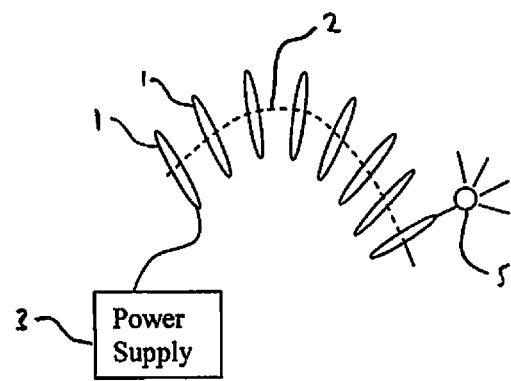

The domino chain method is highly flexible in directing power flow. This was demonstrated by arranging the resonators in an L-shape, in which the power flow path was bent by about 90°, as shown in FIG. 13.

(c) Circular Power-Domino Resonator Arrangement

Figure 14:
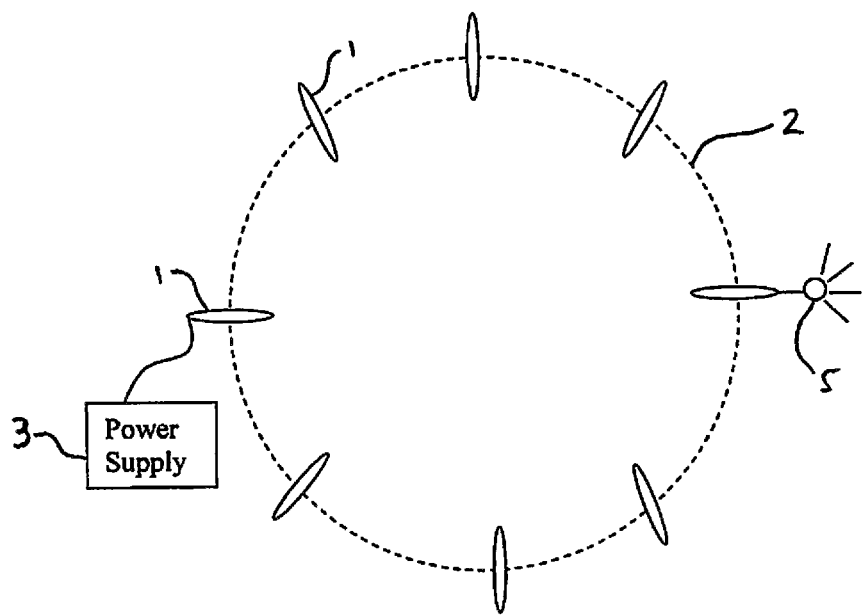

An interesting domino arrangement is to place the loop resonators in a circular form, which was also done during practical experimentation, as shown in FIG. 14. It was demonstrated that the CLF load can be connected across the capacitor in any loop resonator in the circular domino chain.

Figure 15:
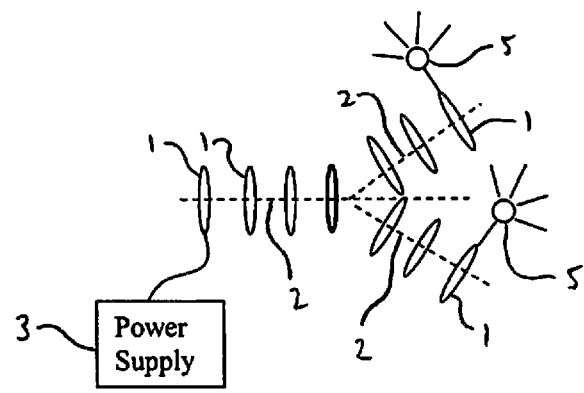
Figure 16:
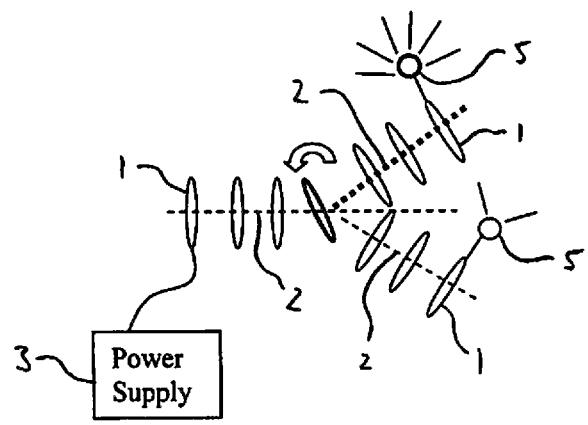

(d) Irregular-Shaped (Y-Shape) Power Domino Resonator Arrangement Demonstrating Power Flow Control by Altering the Angle of the Loop Plane A feature of embodiments of the present invention is the ability of the domino approach to split the power flow and to vary the power flow. In practical experimentation, a curved power flow path was split into two branch paths to power two CFL loads with equal power, as shown in FIG. 15. As shown in FIG. 16, by turning the junction loop plane in an anti-clockwise direction slightly, more power was diverted to the branch path (the upper branch path in FIG. 16) towards which the junction loop plane was turned, so that the CFL on that branch path was brighter than that on the other branch path (the lower branch path in FIG. 16).

Figure 17:
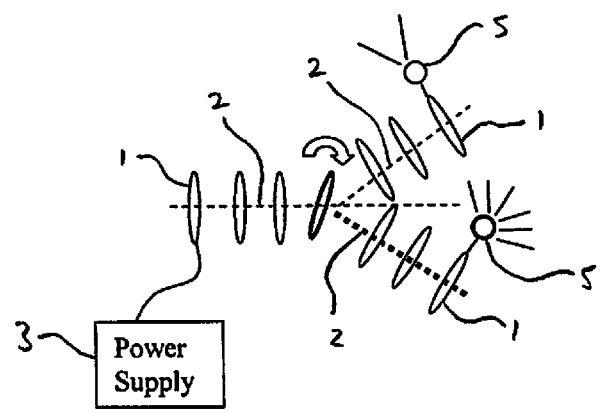

Similarly, as shown in FIG. 17, by turning the junction loop plane slightly in a clockwise direction, more power was diverted to the branch path (the lower branch path in FIG. 17) towards which the junction loop plane was turned, and the CFL on that branch path was brighter than that on the other branch path (the upper branch path in FIG. 17).

The advantages and disadvantages of embodiments of the present invention, as discussed in detail above, are summarized in Table 1 below, which compares major features between embodiments of the present invention and the prior art methods of "short-range" and "mid-range" wireless power transfer based on a pair of loop resonators, and the prior art magneto-inductive waveguide for signal transfer based on a chain of loop resonators.

TABLE 1

Summary comparison between embodiments of the present invention and the prior art.

|  | Short-range coupled resonator pair | Mid-range coupled resonator pair | Magneto-inductive waveguide | Embodiments of the present invention |
| --- | --- | --- | --- | --- |
| Structure | A pair of coupled loop resonators | A pair of coupled loop resonators | A chain of loop resonators | Flexible domino structure |
| Application | Power transfer | Power transfer | Signal transfer | Power Transfer |
| Typical ratio d/r | <3 | >3 | <1 | <3 |
| Energy Efficiency for non-radiative wireless power transfer | Relatively high (~80%-95%) | Relatively low (~40%) | Radiative power | Relatively high (~80%-95%) |
| Power flow | One path | One path | Multi-paths possible | Multi-paths possible |
| Power flow control within the path | No | No | No | Yes |
| Typical operating frequency | >10 kHz | >5 MHz | >100 MHz | >10 kHz |
| Coil separation distance | flexible | flexible | Governed by wavelength of propagating waves | flexible |

Although the invention has been described with reference to specific examples, it will be appreciated by those skilled in the art that the invention can be embodied in many other forms. It will also be appreciated by those skilled in the art that the features of the various examples described can be combined in other combinations.

The invention claimed is:

1. An apparatus for wireless power transfer, comprising:
a source coil resonator directly connected to an AC power source;
a load coil resonator directly connected to a load; and
three or more intermediate coil resonators, each not directly connected to a power source and not directly connected to a load, arranged between the source coil resonator and the load coil resonator to guide power flow therebetween;
each of the source coil resonator, the load coil resonator, and the intermediate coil resonators defining a respective coil plane;
the intermediate coil resonators being arranged so as to form two curved power flow paths from the source coil resonator to the load coil resonator;
the source coil resonator, the load coil resonator, and the intermediate coil resonators being magnetically coupled with each other only by magnetic resonance to wirelessly transfer power along the power flow path;
wherein a ratio of a distance between any two of the coil planes to half the maximum dimension of any of said two coil planes is less than 3 such that magnetic coupling among the source coil resonator, the load coil resonator, and the intermediate coil resonators is non-radiative; and
wherein the two curved power flow paths, when combined, are in a circular form.

2. The apparatus according to claim 1 wherein one or both of a resonant frequency and an impedance of the intermediate coil resonators is variable for affecting the power flow.

3. The apparatus according to claim 2 wherein the intermediate coil resonators each has one or both of a capacitance and an inductance, and the resonant frequency of one or more of the intermediate coil resonators can be varied by varying one or both of the capacitance and the inductance.

4. The apparatus according to claim 1 wherein a distance between one pair of the coil planes is not equal to a distance between another pair of the coil planes.

5. The apparatus according to claim 1 wherein the source coil resonator, the load coil resonator, and the intermediate coil resonators have an operating frequency of less than 100 MHz.

6. The apparatus according to claim 1 wherein the source coil resonator, the load coil resonator, and the intermediate coil resonators have an operating frequency of less than 10 MHz.

7. The apparatus according to claim 1 wherein the source coil resonator, the load coil resonator, and the intermediate coil resonators have an operating frequency of less than 5 MHz.

8. The apparatus according to claim 1 wherein the source coil resonator, the load coil resonator, and the intermediate coil resonators have an operating frequency of less than 1 MHz.

9. The apparatus according to claim 1 wherein the source coil resonator, the load coil resonator, and the intermediate coil resonators have an operating frequency of greater than 10 kHz.

10. The apparatus according to claim 1 wherein the intermediate coil resonators are made from superconductive material.

\* \* \* \* \*